(12) United States Patent
Yang

(10) Patent No.: US 9,696,776 B2
(45) Date of Patent: Jul. 4, 2017

(54) ELECTRONIC DEVICE AND SWITCH CIRCUIT FOR SWITCHING OPERATION MODES OF POWER SUPPLY UNITS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 227 days.

(21) Appl. No.: 14/725,549

(22) Filed: May 29, 2015

(65) Prior Publication Data

US 2016/0268837 A1    Sep. 15, 2016

(30) Foreign Application Priority Data

Mar. 11, 2015    (CN) .......................... 2015 1 0105814

(51) Int. Cl.
*H02J 9/06* (2006.01)
*G06F 1/26* (2006.01)

(52) U.S. Cl.
CPC .................................. *G06F 1/26* (2013.01)

(58) Field of Classification Search
None
See application file for complete search history.

(56) References Cited

U.S. PATENT DOCUMENTS

| | | | | |
|---|---|---|---|---|
| 2004/0130919 | A1* | 7/2004 | Sullivan | G06F 1/24 363/49 |
| 2009/0271642 | A1* | 10/2009 | Cheng | G06F 1/263 713/300 |
| 2013/0147271 | A1* | 6/2013 | Yotsuji | H02J 4/00 307/28 |
| 2016/0204651 | A1* | 7/2016 | Pancheri | H02J 9/061 307/23 |

* cited by examiner

*Primary Examiner* — Jared Fureman
*Assistant Examiner* — Aqeel Bukhari
(74) *Attorney, Agent, or Firm* — Steven Reiss

(57) ABSTRACT

A switch circuit includes a voltage follower module, a comparison module and a switch module coupled to the voltage follower module, the comparison module and a power supply. The voltage follower can receive a first control signal and a second control signal. The comparison module can receive the first control signal and the second control signal. The comparison module compares a voltage of the first control signal and the second control signal with a reference voltage. When the comparison module outputs a first signal to turn on the switch module, the first power supply unit and the second power supply unit work in the first operation mode. When the comparison module outputs a second signal to turn off the switch module, the first power supply unit and the second power supply unit work in the second operation mode.

14 Claims, 1 Drawing Sheet

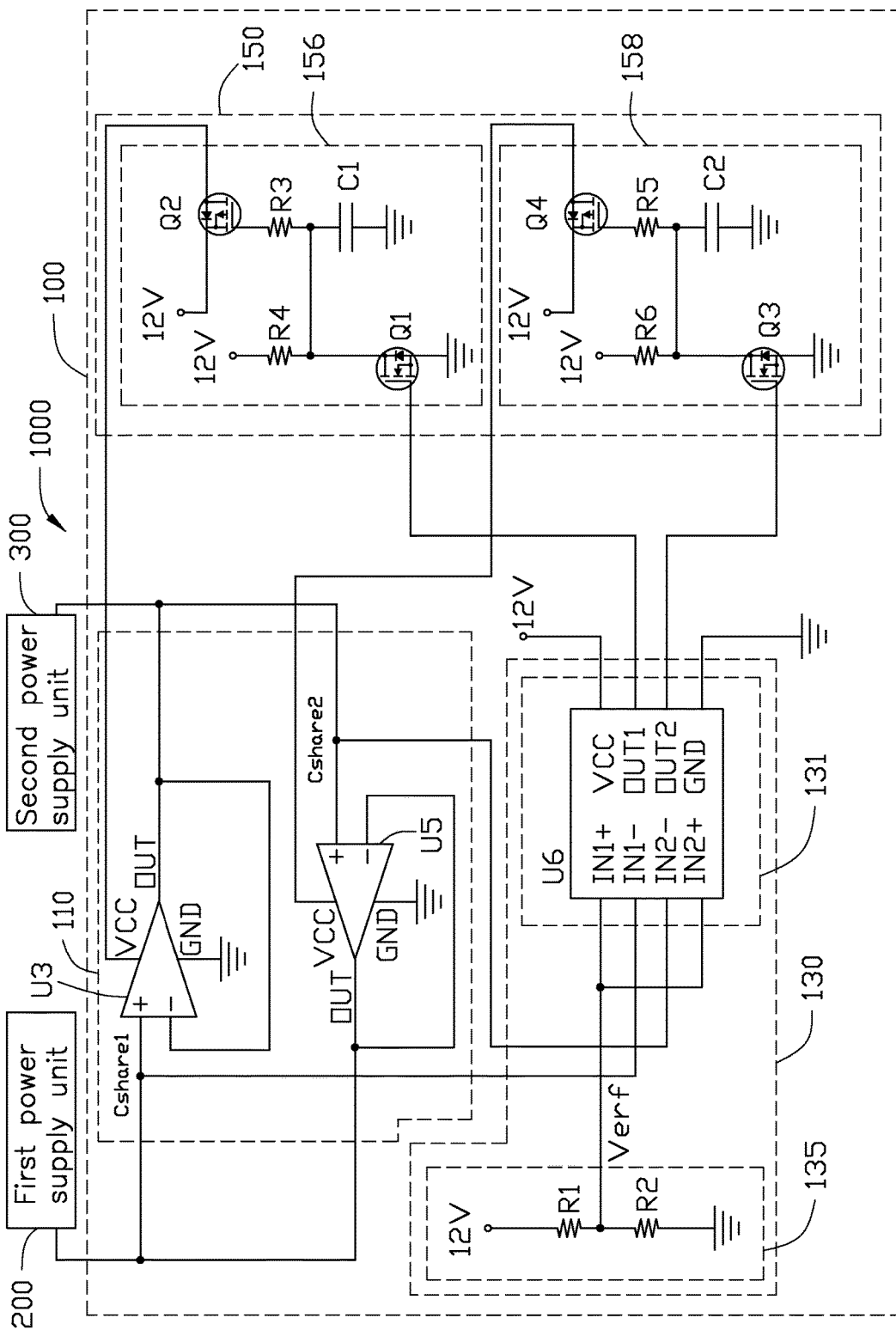

ELECTRONIC DEVICE AND SWITCH CIRCUIT FOR SWITCHING OPERATION MODES OF POWER SUPPLY UNITS

FIELD

The subject matter herein generally relates to electronic devices, and particularly to an electronic device with a switch circuit for switching operation modes of power supply units.

BACKGROUND

Power supply units of a server system usually operate in a 1+1 operation mode. In the 1+1 operation mode, two power supply units are connected in parallel, and both output at half power to the server system. When one of the two power supply units is down, the other power supply unit will output more power to ensure the server system operates normally. When the server system needs more power, the two power supply units should be operated in a 2+0 operation mode. In the 2+0 operation mode, the two power supply units are connected in series, and both output full power to the server system. However, the power supply units of the server system can only operate in the 1+1 operation mode or the 2+0 operation mode.

BRIEF DESCRIPTION OF THE DRAWING

Implementations of the present technology will now be described, by way of example only, with reference to the attached FIGURE.

The FIGURE is a circuit diagram of an embodiment of an electronic device.

DETAILED DESCRIPTION

It will be appreciated that for simplicity and clarity of illustration, where appropriate, reference numerals have been repeated among the different FIGURES to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawing is not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure relates to an electronic device and a switch circuit for switching operation modes of power supply units.

The FIGURE illustrates an embodiment of an electronic device 1000. The electronic device 1000 can comprise a power distribution board, a first power supply unit 200, and a second power supply unit 300. The power distribution board can comprise a switch circuit 100 for switching operation modes of the first power supply unit 200 and the second power supply unit 300. The first power supply unit 200 outputs a control signal Cshare1 and the second power supply unit 300 outputs a control signal Cshare2. The switch circuit 100 is electrically coupled to the first power supply unit 200 and the second power supply unit 300. The switch circuit 100 can control the first power supply unit 200 and the second power supply unit 300 to be switched between a first operation mode and a second operation mode. When the second power supply unit 300 receives the control signal Cshare1 output by the first power supply unit 200 and the first power supply unit 200 receives the control signal Cshare2 output by the second power supply unit 300, the first power supply unit 200 and the second power supply unit 300 work in the first operation mode. When the second power supply unit 300 does not receive the control signal Cshare1 output by the first power supply unit 200 and the first power supply unit 200 does not receive the control signal Cshare2 output by the second power supply unit 300, the first power supply unit 200 and the second power supply unit 300 work in the second operation mode.

In at least one embodiment, the electronic device 1000 can be a server or a data center. The first operation mode is a 1+1 operation mode, and the first power supply unit 200 and the second power supply unit 300 are coupled in parallel and both output at half power. The second operation mode is a 2+0 operation mode, and the first power supply unit 200 and the second power supply unit 300 are coupled in series and both output full power. For example, if a maximum output power of each of the first power supply unit 200 and the second power supply unit 300 is 1200 W, the total output power of the first power supply unit 200 and the second power supply unit 300 are 1200 W when the first power supply unit 200 and the second power supply unit 300 work in the first operation mode, and the total output power of the first power supply unit 200 and the second power supply unit 300 are 2400 W when the first power supply unit 200 and the second power supply unit 300 work in the second operation mode.

The switch circuit 100 can comprise a voltage follower module 110, a comparison module 130 and a switch module 150.

The voltage follower module 110 can comprise a first operational amplifier U3 and a second operational amplifier U5. A non-inverting input terminal of the first operational amplifier U3 is electrically coupled to the first power supply unit 200 and configured to receive the control signal Cshare1. An inverting input terminal of the first operational amplifier U3 is electrically coupled to an output terminal OUT of the first operational amplifier U3. The output terminal OUT of the first operational amplifier U3 is electrically coupled to the second power supply unit 300. A power supply terminal VCC of the first operational amplifier U3 is electrically coupled to the switch module 150, and a ground terminal GND of the first operational amplifier U3 is electrically coupled to a ground. A non-inverting input terminal of the second operational amplifier U5 is electrically coupled to the second power supply unit 300 and configured to receive the control signal Cshare2. An inverting input terminal of the second operational amplifier U5 is electrically coupled to an output terminal OUT of the second operational amplifier U5. The output terminal OUT of the second operational amplifier U5 is electrically coupled to the first power supply unit 200. A power supply terminal VCC of the second operational amplifier U5 is electrically coupled to the switch module 150, and a ground terminal GND of the second operational amplifier U5 is electrically coupled to the ground.

The comparison module 130 can comprise a comparison unit 131 and a voltage-dividing unit 135. The comparison unit 131 can comprise a comparator U6. The voltage-dividing unit 135 can comprise two resistors R1 and R2. The voltage-dividing unit 135 can provide a reference voltage Verf to the comparator U6. The comparator U6 can comprise four input pins IN1+, IN1−, IN2+, and IN2−, two output pins OUT1 and OUT2, a power supply pin VCC and a grounded pin GND. The input pin IN1− is electrically coupled to the first power supply unit 200 and configured to receive the control signal Cshare1. The input pin IN2− is electrically coupled to the second power supply unit 300 and configured to receive the control signal Cshare2. The input pins IN1+ and IN2+ are electrically coupled to a power supply 12V through the resistor R1, and coupled to the ground through the resistor R2. The power supply pin VCC of the comparator U6 is electrically coupled to the power supply 12V. The grounded pin GND is coupled to the ground. The output pins OUT1 and OUT2 of the comparator U6 are both electrically coupled to the switch module 150. A node between the resistors R1 and R2 outputs the reference voltage Verf to the input pins IN1+ and IN2+ of the comparator U6. In at least one embodiment, the reference voltage Verf is 8V. In other embodiments, the reference voltage Verf can be adjusted by adjusting resistance of the resistors R1 and R2.

The switch module 150 can comprise a first switch unit 156 and a second switch unit 158. The first switch unit 156 can comprise two electronic switches Q1 and Q2, two resistors R3 and R4, and a capacitor C1. A first terminal of the electronic switch Q1 is electrically coupled to the output pin OUT1 of the comparator U6. A second terminal of the electronic switch Q1 is electrically coupled to a first terminal of the electronic switch Q2 through the resistor R3, electrically coupled to the power supply 12V through the resistor R4, and electrically coupled to the ground through the capacitor C1. A third terminal of the electronic switch Q1 is electrically coupled to the ground. A second terminal of the electronic switch Q2 is electrically coupled to the power supply terminal VCC of the first operational amplifier U3. A third terminal of the electronic switch Q2 is electrically coupled to the power supply 12V.

The second switch unit 158 can comprise two electronic switches Q3 and Q4, two resistors R5 and R6, and a capacitor C2. A first terminal of the electronic switch Q3 is electrically coupled to the output pin OUT2 of the comparator U6. A second terminal of the electronic switch Q3 is electrically coupled to a first terminal of the electronic switch Q4 through the resistor R5, electrically coupled to the power supply 12V through the resistor R6, and electrically coupled to the ground through the capacitor C2. A third terminal of the electronic switch Q3 is electrically coupled to the ground. A second terminal of the electronic switch Q4 is electrically coupled to the power supply terminal VCC of the second operational amplifier U5. A third terminal of the electronic switch Q4 is electrically coupled to the power supply 12V.

In at least one embodiment, each of the electronic switches Q1 and Q3 can be an n-channel metal-oxide semiconductor field-effect transistor (NMOSFET), and the first terminal, the second terminal, and the third terminal of each of the electronic switches Q1 and Q3 correspond to a gate, a drain, and a source of the n-channel metal-oxide semiconductor field-effect transistor (NMOSFET). Each of the electronic switches Q2 and Q4 can be a p-channel metal-oxide semiconductor field-effect transistor (PMOSFET), and the first terminal, the second terminal, and the third terminal of each of the electronic switches Q2 and Q4 correspond to a gate, a drain, and a source of the p-channel metal-oxide semiconductor field-effect transistor (PMOSFET). In other embodiments, each of the electronic switches Q1 and Q3 can be an npn-type bipolar junction transistor or other suitable switch having similar functions. Each of the electronic switches Q2 and Q4 can be a pnp-type bipolar junction transistor or other suitable switch having similar functions.

In operation, the comparator U6 will compare a voltage of the control signal Cshare1 output by the first power supply unit 200 with the reference voltage Verf, and compare a voltage of the control signal Cshare2 output by the second power supply unit 300 with the reference voltage Verf. When the voltage of the control signals Cshare1 and Cshare2 are both less than the reference voltage Verf, the output pins OUT1 and OUT2 of the comparator U6 both output a high level signal to turn on the electronic switches Q1, Q2, Q3 and Q4. The power supply 12V provides power for the power supply terminal VCC of the first operational amplifier U3 through the electronic switch Q2, and the first operational amplifier U3 operates. The power supply 12V provides power for the power supply terminal VCC of the second operational amplifier U5 through the electronic switch Q4, and the second operational amplifier U5 operates. The voltage of the control signals Cshare1 and Cshare2 are adjusted to be equal by the first operational amplifier U3 and the second operational amplifier U5, and the control signals Cshare1 and Cshare2 are the same. That is the first power supply unit 200 and the second power supply unit 300 output and input the same control signal. In other words, the second power supply unit 300 receives the control signal Cshare1 output by the first power supply unit 200 and the first power supply unit 200 receives the control signal Cshare2 output by the second power supply unit 300, the first power supply unit 200 and the second power supply unit 300 work in the first operation mode.

When the voltage of the control signals Cshare1 and Cshare2 are both more than the reference voltage Verf, the output pins OUT1 and OUT2 of the comparator U6 both output a low level signal to turn off the electronic switches Q1, Q2, Q3 and Q4. The power supply terminals VCC of the first operational amplifier U3 and the second operational amplifier U5 do not receive power, and the first operational amplifier U3 and the second operational amplifier U5 do not operate. The second power supply unit 300 does not receive the control signal Cshare1 output by the first power supply unit 200 and the first power supply unit 200 does not receive the control signal Cshare2 output by the second power supply unit 300, the first power supply unit 200 and the second power supply unit 300 work in the second operation mode.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. A switch circuit configured to control a first power supply unit and a second power supply unit to be switched between a first operation mode and a second operation mode, the switch circuit comprising:
   a voltage follower module electrically coupled to the first power supply unit and configured to receive a first control signal therefrom, and electrically coupled to the second power supply unit and configured to receive a second control signal therefrom;
   a comparison module electrically coupled to the first power supply unit and configured to receive the first control signal therefrom, and electrically coupled to the second power supply unit and configured to receive the second control signal therefrom, the comparison module further configured to compare a voltage of the first control signal and the second control signal with a reference voltage; and
   a switch module electrically coupled to the voltage follower module, the comparison module and a power supply;
   wherein in event that the voltage of the first control signal and the second control signal are both less than the reference voltage, the comparison module outputs a first signal to turn on the switch module, the power supply provides power for the voltage follower module through the switch module, the voltage follower module operates, the voltage of the first control signals and the second control signals are adjusted to be equal by the voltage follower module, the second power supply unit receives the first control signal output by the first power supply unit and the first power supply unit receives the second control signal output by the second power supply unit, and the first power supply unit and the second power supply unit work in the first operation mode;
   wherein in event that the voltage of the first control signals and the second control signal are both more than the reference voltage, the comparison module outputs a second signal to turn off the switch module, the voltage follower module is not powered by the power supply and does not operate, the second power supply unit does not receive the first control signal output by the first power supply unit and the first power supply unit does not receive the second control signal output by the second power supply unit, and the first power supply unit and the second power supply unit work in the second operation mode.

2. The switch circuit of claim 1, wherein the comparison module comprises a comparator, the comparator comprises a first input pin, a second input pin, a third input pin, a fourth input pin, a first output pin and a second output pin, the first input pin is electrically coupled to the first power supply unit to receive the first control signal, the second input pin is electrically coupled to the second power supply unit to receive the second control signal, the third input pin and the fourth input pin receive the reference voltage, the first output pin and the second output pin are both electrically coupled to the switch module, in event that the voltage of the first control signals and the second control signal are both less than the reference voltage, the first output pin and the second output pin output the first signal to the switch module, in event that the voltage of the first control signals and the second control signal are both more than the reference voltage, the first output pin and the second output pin output the second signal to the switch module.

3. The switch circuit of claim 2, wherein the switch module comprises a first switch unit coupled to the power supply and the voltage follower module and a second switch unit coupled to the power supply and the voltage follower module, the first switch unit is electrically coupled to the first output pin of the comparator to receive the first signal and the second signal, the second switch unit is electrically coupled to the second output pin of the comparator to receive the first signal and the second signal, when the first switch unit receives the first signal, the first switch unit is turned on, the power supply outputs power to the voltage follower module through the first switch unit, when the first switch unit receives the second signal, the first switch unit is turned off, when the second switch unit receives the first signal, the second switch unit is turned on, the power supply outputs power to the voltage follower module through the second switch unit, when the second switch unit receives the second signal, the second switch unit is turned off.

4. The switch circuit of claim 3, wherein the voltage follower module comprises a first operational amplifier and a second operational amplifier, a non-inverting input terminal of the first operational amplifier is electrically coupled to the first power supply unit to receive the first control signal, an inverting input terminal of the first operational amplifier is electrically coupled to an output terminal of the first operational amplifier, the output terminal of the first operational amplifier is electrically coupled to the second power supply unit, a power supply terminal of the first operational amplifier is electrically coupled to the first switch unit, a non-inverting input terminal of the second operational amplifier is electrically coupled to the second power supply unit to receive the second control signal, an inverting input terminal of the second operational amplifier is electrically coupled to an output terminal of the second operational amplifier, the output terminal of the second operational amplifier is electrically coupled to the first power supply unit, a power supply terminal of the second operational amplifier is electrically coupled to the second switch unit, when the first switch unit and the second switch unit are turned on, the power supply provides power to the power supply terminal of the first operational amplifier through the first switch unit, and provides power to the power supply terminal of the second operational amplifier through the second switch unit, the first operational amplifier and the second operational amplifier operate, the voltage of the first control signal and the second control signal is equal, when the first switch unit and the second switch unit are turned off, the power supply terminals of the first operational amplifier and the second operational amplifier are not powered by the power supply, the first operational amplifier and the second operational amplifier do not operate.

5. The switch circuit of claim 3, wherein the first switch unit comprises a first electronic switch, a second electronic switch, a first resistor, and a first capacitor, a first terminal of the first electronic switch is electrically coupled to the first output pin of the comparator, a second terminal of the first electronic switch is electrically coupled to a first terminal of the second electronic switch, electrically coupled to the power supply through the first resistor, and electrically coupled to the ground through the first capacitor, a third terminal of the first electronic switch is electrically coupled to the ground, a second terminal of the second electronic switch is electrically coupled to the power supply terminal of the first operational amplifier, and a third terminal of the second electronic switch is electrically coupled to the power supply; in event that the first terminal of the first electronic switch receives the first signal, the first electronic switch and the second electronic switch are turned on, the power supply provides power to the power supply terminal of the first operational amplifier through the second electronic switch; and in event that the first terminal of the first electronic switch receives the second signal, the first electronic switch and the second electronic switch are turned off, the power supply terminal of the first operational amplifier is not powered by the power supply.

6. The switch circuit of claim 3, wherein the second switch unit comprises a third electronic switch, a fourth electronic switch, a second resistor, and a second capacitor, a first terminal of the third electronic switch is electrically coupled to the second output pin of the comparator, a second terminal of the third electronic switch is electrically coupled to a first terminal of the fourth electronic switch, electrically coupled to the power supply through the second resistor, and electrically coupled to the ground through the second capacitor, a third terminal of the third electronic switch is electrically coupled to the ground, a second terminal of the fourth electronic switch is electrically coupled to the power supply terminal of the second operational amplifier, and a third terminal of the fourth electronic switch is electrically coupled to the power supply; in event that the first terminal of the third electronic switch receives the first signal, the third electronic switch and the fourth electronic switch are turned on, the power supply provides power to the power supply terminal of the second operational amplifier through the fourth electronic switch; when the first terminal of the third electronic switch receives the second signal, the third electronic switch and the fourth electronic switch are turned off, the power supply terminal of the second operational amplifier is not power by the power supply.

7. The switch circuit of claim 2, wherein the comparison module further comprises a voltage-dividing unit configured to provide the reference voltage, the voltage-dividing unit comprises a third resistor and a fourth resistor, the third input pin and the fourth input pin of the comparator are electrically coupled to the power supply through the third resistor, and electrically coupled to the ground through the fourth resistor, a node between the third resistor and the fourth resistor outputs the reference voltage to the third input pin and the fourth input pin of the comparator.

8. An electronic device comprising:
   a first power supply unit configured to output a first control signal;
   a second power supply unit configured to output a second control signal; and
   a switch circuit comprising;
      a voltage follower module electrically coupled to the first power supply unit and configured to receive a first control signal therefrom, and electrically coupled to the second power supply unit and configured to receive a second control signal therefrom;
      a comparison module electrically coupled to the first power supply unit and configured to receive the first control signal therefrom, and electrically coupled to the second power supply unit and configured to receive the second control signal therefrom, the comparison module further configured to compare a voltage of the first control signal and the second control signal with a reference voltage; and
      a switch module electrically coupled to the voltage follower module, the comparison module and a power supply;
   wherein in event that the voltage of the first control signal and the second control signal are both less than the reference voltage, the comparison module outputs a first signal to turn on the switch module, the power supply provides power for the voltage follower module through the switch module, the voltage follower module operates, the voltage of the first control signals and the second control signals are adjusted to be equal by the voltage follower module, the second power supply unit receives the first control signal output by the first power supply unit and the first power supply unit receives the second control signal output by the second power supply unit, and the first power supply unit and the second power supply unit work in the first operation mode;
   wherein in event that the voltage of the first control signals and the second control signal are both more than the reference voltage, the comparison module outputs a second signal to turn off the switch module, the voltage follower module is not powered by the power supply and does not operate, the second power supply unit does not receive the first control signal output by the first power supply unit and the first power supply unit does not receive the second control signal output by the second power supply unit, and the first power supply unit and the second power supply unit work in the second operation mode.

9. The electronic device of claim 8, wherein the comparison module comprises a comparator, the comparator comprises a first input pin, a second input pin, a third input pin, a fourth input pin, a first output pin and a second output pin, the first input pin is electrically coupled to the first power supply unit to receive the first control signal, the second input pin is electrically coupled to the second power supply unit to receive the second control signal, the third input pin and the fourth input pin receive the reference voltage, the first output pin and the second output pin are both electrically coupled to the switch module, in event that the voltage of the first control signals and the second control signal are both less than the reference voltage, the first output pin and the second output pin output the first signal to the switch module, in event that the voltage of the first control signals and the second control signal are both more than the reference voltage, the first output pin and the second output pin output the second signal to the switch module.

10. The electronic device of claim 9, wherein the switch module comprises a first switch unit coupled to the power supply and the voltage follower module and a second switch unit coupled to the power supply and the voltage follower module, the first switch unit is electrically coupled to the first output pin of the comparator to receive the first signal and the second signal, the second switch unit is electrically coupled to the second output pin of the comparator to receive the first signal and the second signal, when the first switch unit receives the first signal, the first switch unit is turned on, the power supply outputs power to the voltage follower module through the first switch unit, when the first switch unit receives the second signal, the first switch unit is turned off, when the second switch unit receives the first signal, the second switch unit is turned on, the power supply outputs power to the voltage follower module through the second switch unit, when the second switch unit receives the second signal, the second switch unit is turned off.

11. The electronic device of claim 10, wherein the voltage follower module comprises a first operational amplifier and a second operational amplifier, a non-inverting input terminal of the first operational amplifier is electrically coupled to the first power supply unit to receive the first control signal, an inverting input terminal of the first operational amplifier is electrically coupled to an output terminal of the first operational amplifier, the output terminal of the first operational amplifier is electrically coupled to the second power supply unit, a power supply terminal of the first operational amplifier is electrically coupled to the first switch unit, a non-inverting input terminal of the second operational amplifier is electrically coupled to the second power supply unit to receive the second control signal, an inverting input terminal of the second operational amplifier is electrically coupled to an output terminal of the second operational amplifier, the output terminal of the second operational amplifier is electrically coupled to the first power supply unit, a power supply terminal of the second operational amplifier is electrically coupled to the second switch unit, when the first switch unit and the second switch unit are turned on, the power supply provides power to the power supply terminal of the first operational amplifier through the first switch unit, and provides power to the power supply terminal of the second operational amplifier through the second switch unit, the first operational amplifier and the second operational amplifier operate, the voltage of the first control signal and the second control signal is equal, when the first switch unit and the second switch unit are turned off, the power supply terminals of the first operational amplifier and the second operational amplifier are not powered by the power supply, the first operational amplifier and the second operational amplifier do not operate.

12. The electronic device of claim 10, wherein the first switch unit comprises a first electronic switch, a second electronic switch, a first resistor, and a first capacitor, a first terminal of the first electronic switch is electrically coupled to the first output pin of the comparator, a second terminal of the first electronic switch is electrically coupled to a first terminal of the second electronic switch, electrically coupled to the power supply through the first resistor, and electrically coupled to the ground through the first capacitor, a third terminal of the first electronic switch is electrically coupled to the ground, a second terminal of the second electronic switch is electrically coupled to the power supply terminal of the first operational amplifier, and a third terminal of the second electronic switch is electrically coupled to the power supply; in event that the first terminal of the first electronic switch receives the first signal, the first electronic switch and the second electronic switch are turned on, the power supply provides power to the power supply terminal of the first operational amplifier through the second electronic switch; and in event that the first terminal of the first electronic switch receives the second signal, the first electronic switch and the second electronic switch are turned off, the power supply terminal of the first operational amplifier is not powered by the power supply.

13. The electronic device of claim 10, wherein the second switch unit comprises a third electronic switch, a fourth electronic switch, a second resistor, and a second capacitor, a first terminal of the third electronic switch is electrically coupled to the second output pin of the comparator, a second terminal of the third electronic switch is electrically coupled to a first terminal of the fourth electronic switch, electrically coupled to the power supply through the second resistor, and electrically coupled to the ground through the second capacitor, a third terminal of the third electronic switch is electrically coupled to the ground, a second terminal of the fourth electronic switch is electrically coupled to the power supply terminal of the second operational amplifier, and a third terminal of the fourth electronic switch is electrically coupled to the power supply; in event that the first terminal of the third electronic switch receives the first signal, the third electronic switch and the fourth electronic switch are turned on, the power supply provides power to the power supply terminal of the second operational amplifier through the fourth electronic switch; when the first terminal of the third electronic switch receives the second signal, the third electronic switch and the fourth electronic switch are turned off, the power supply terminal of the second operational amplifier is not power by the power supply.

14. The electronic device of claim 9, wherein the comparison module further comprises a voltage-dividing unit configured to provide the reference voltage, the voltage-dividing unit comprises a third resistor and a fourth resistor, the third input pin and the fourth input pin of the comparator are electrically coupled to the power supply through the third resistor, and electrically coupled to the ground through the fourth resistor, a node between the third resistor and the fourth resistor outputs the reference voltage to the third input pin and the fourth input pin of the comparator.

\* \* \* \* \*